(12) United States Patent
Lai et al.

(10) Patent No.: US 10,044,829 B2
(45) Date of Patent: Aug. 7, 2018

(54) CONTROL SYSTEM AND METHOD FOR CACHE COHERENCY

(71) Applicant: VIA Alliance Semiconductor Co., Ltd., Shanghai (CN)

(72) Inventors: Jiin Lai, New Taipei (TW); Meng-Chen Yang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 268 days.

(21) Appl. No.: 14/740,526

(22) Filed: Jun. 16, 2015

(65) Prior Publication Data

US 2016/0156734 A1    Jun. 2, 2016

(30) Foreign Application Priority Data

Nov. 28, 2014  (CN) .......................... 2014 1 0709312

(51) Int. Cl.
*H04L 29/08* (2006.01)
*G06F 9/48* (2006.01)
(Continued)

(52) U.S. Cl.
CPC ........ *H04L 67/2857* (2013.01); *G06F 9/4856* (2013.01); *G06F 12/0813* (2013.01);
(Continued)

(58) Field of Classification Search
CPC ............. H04L 67/2857; H04L 67/1095; G06F 9/4856; G06F 12/0813; G06F 12/0815;
(Continued)

(56) References Cited

U.S. PATENT DOCUMENTS

2003/0041324 A1* 2/2003 Anderson ............. G06F 9/4411
717/174
2003/0236957 A1 12/2003 Miller et al.
(Continued)

FOREIGN PATENT DOCUMENTS

EP         2 570 920        3/2013
KR    10-2013-0012120 A    2/2013
KR    10-2014-0116935 A   10/2014

OTHER PUBLICATIONS

Korean language office action dated Jan. 18, 2017, issued in application No. KR 10-2015-0164515.
(Continued)

*Primary Examiner* — Brian J Gillis
*Assistant Examiner* — Amy Ling
(74) *Attorney, Agent, or Firm* — McClure, Qualey & Rodack, LLP (57) ABSTRACT

Control systems and methods for cache coherency are provided. One control method includes steps of transmitting a link-connect request to a second electrical device when the first electrical device is coupled to the second electrical device by a cache coherency (CC) interface by a first electrical device, establishing a link between the first electrical device and second electrical device according to the link-connect request by the CC interface, and operating a first operating system of the first electrical device by a second processing unit of the second electrical device after establishing the link.

16 Claims, 8 Drawing Sheets

(51) Int. Cl.
  *G06F 12/08* (2016.01)
  *G06F 12/0813* (2016.01)
  *G06F 12/0815* (2016.01)
  *G06F 12/0842* (2016.01)
  *G06F 15/163* (2006.01)

(52) U.S. Cl.
  CPC ...... *G06F 12/0815* (2013.01); *H04L 67/1095* (2013.01); *G06F 12/0842* (2013.01); *G06F 15/163* (2013.01); *G06F 2212/1016* (2013.01)

(58) Field of Classification Search
  CPC ............... G06F 12/0842; G06F 15/163; G06F 2212/1016
  See application file for complete search history.

(56) References Cited

U.S. PATENT DOCUMENTS

| | | | |
|---|---|---|---|
| 2004/0093469 A1 | 5/2004 | Glasco | |
| 2008/0109609 A1* | 5/2008 | Shen | G06F 12/0831 711/146 |
| 2009/0089780 A1* | 4/2009 | Johnson | G06F 9/5077 718/1 |
| 2010/0146222 A1* | 6/2010 | Cox | G06F 12/0284 711/154 |
| 2010/0192142 A1* | 7/2010 | Sun | G06F 9/445 717/168 |
| 2011/0213993 A1 | 9/2011 | Greenhalgh | |
| 2012/0198158 A1* | 8/2012 | Nikara | G06F 12/0846 711/118 |
| 2013/0117511 A1 | 5/2013 | Brown et al. | |
| 2013/0185520 A1 | 7/2013 | Dieffenderfer et al. | |
| 2013/0311725 A1 | 11/2013 | Greenhalgh | |
| 2014/0223116 A1* | 8/2014 | Jeddeloh | G06F 13/1626 711/158 |
| 2015/0113230 A1* | 4/2015 | Cheng | G06F 12/0824 711/145 |
| 2015/0256484 A1* | 9/2015 | Cameron | G06F 9/3004 709/226 |

OTHER PUBLICATIONS

European Search Report dated Jun. 8, 2016, issued in application No. 15192930.4-1953.
Nitzberg, B. et al.; "Distributed shared memory: a survey of issues and algorithms;" IEEE; Aug. 1991; pp. 52-60.
Lenoski, D. et al.; "The directory-based cache coherence protocol for the DASH multiprocessor;" IEEE; May 1990; pp. 148-159.
European Office Action dated Jun. 29, 2017, issued in application No. EP 15 192 930.4-1953.

* cited by examiner

CONTROL SYSTEM AND METHOD FOR CACHE COHERENCY

CROSS REFERENCE TO RELATED APPLICATIONS

This Application claims priority of China Patent Application No. 201410709312.X filed on Nov. 28, 2014, the entirety of which is incorporated by reference herein.

BACKGROUND OF THE INVENTION

Field of the Invention

The invention generally relates to control method between devices, and more particularly, to methods of controlling the devices for cache coherency (CC).

Description of the Related Art

Recently, because of the rapid development of wireless communications, devices such as mobile phones, smart-phones, personal digital assistants, and tablet PCs have become widely available, and have become more and more technically advanced and multifunctional. Due to the increased convenience and functionality of these devices, they have become necessities of life.

When a user operates a plurality of devices and wants to use a device to assist another device in data-processing, the user needs to first transmit the data to the device, then process the data using the software and hardware of the device, and transmit the processed data back to the other device. The user could not directly assist the software of the other device with the data-processing with the hardware of the device. Therefore, it is not convenient for the user.

BRIEF SUMMARY OF THE INVENTION

A control system and method for cache coherency are provided to overcome the aforementioned problems.

An embodiment of the invention provides a control method for cache coherency. The control method comprises the steps of transmitting a link-connect request to a second electrical device when the first electrical device is coupled to the second electrical device by a cache coherency (CC) interface by a first electrical device, establishing a link between the first electrical device and second electrical device according to the link-connect request by the CC interface, and operating a first operating system of the first electrical device by a second processing unit of the second electrical device after establishing the link.

An embodiment of the invention provides a control system for cache coherency. The control system comprises a first electrical device, a CC interface and a second electrical device. The first electrical device is configured to transmit a link-connect request to establish a link. The CC interface is configured to establish the link according to the link-connect request. The second electrical device comprises a second processing unit. In the embodiment, when the first electrical device is coupled to the second electrical device by the CC interface, the first electrical device transmits the link-connect request to the second electrical device, and the second processing unit operates a first operating system of the first electrical device after the link has been established.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
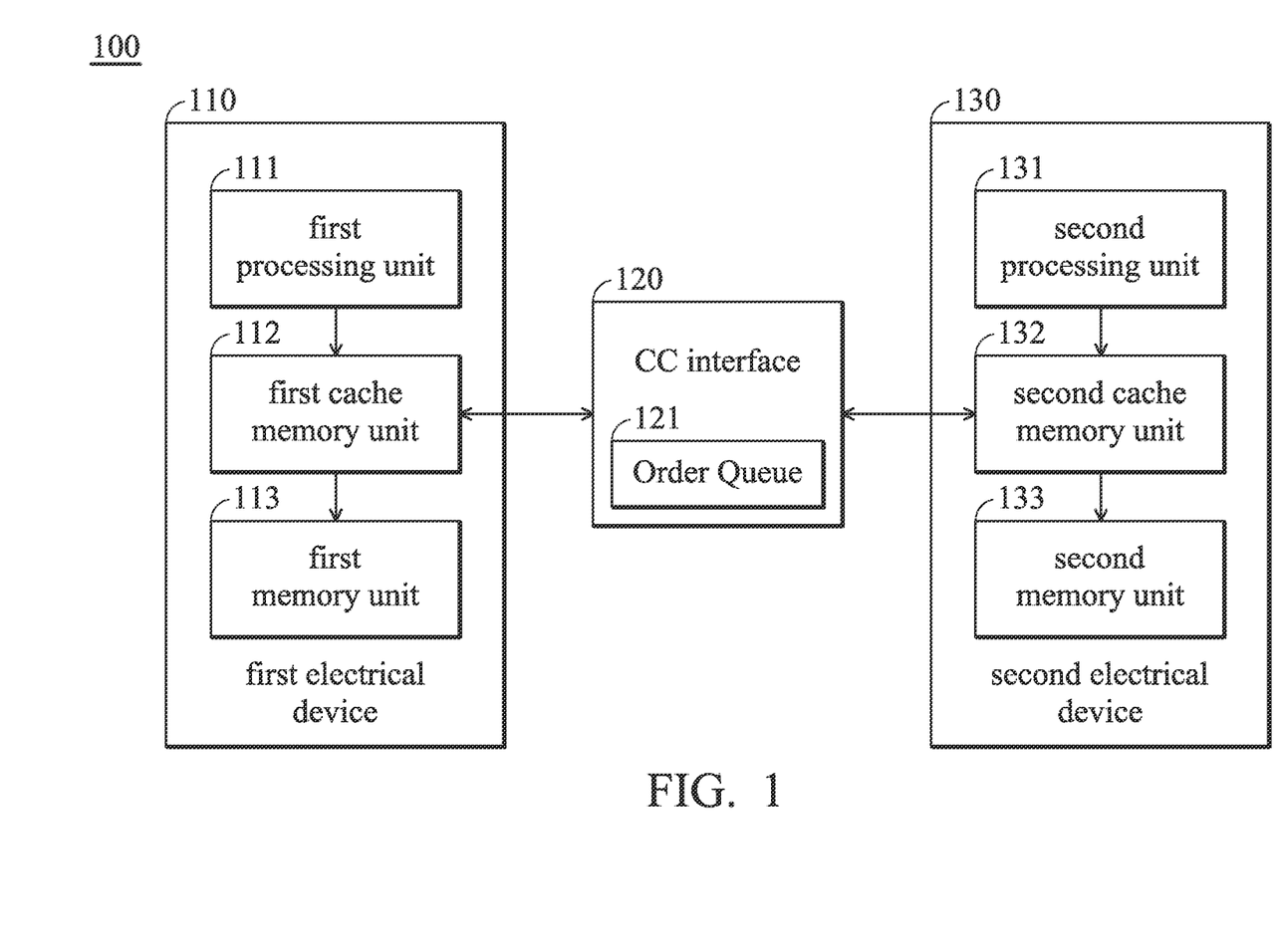
FIG. 1 is a control system 100 for cache coherent according to an embodiment of the invention.

FIG. 1 is a control system 100 for cache coherent according to an embodiment of the invention. As shown in FIG. 1, the control system 100 comprises a first electrical device 110, a cache coherency (CC) interface 120 and a second electrical device 130. The first electrical device 110 comprises a first processing unit 111, a first cache memory unit 112, and a first memory unit 113. The second electrical device 130 comprises a second processing unit 131, a second cache memory unit 132, and a second memory unit 133. FIG. 1 presents a simplified block diagram in which only the elements relevant to the invention are shown. However, the invention should not be limited to what is shown in FIG. 1.

In an embodiment of the invention, the first electrical device 110 is configured to connect with a computing device, such as a laptop computer or desktop computer, or it can be a self-contained device such as a personal digital assistant (PDA). The first electrical device 110 can also be called a system, a subscriber unit, a subscriber station, mobile station, mobile, remote station, access point, remote terminal, access terminal, user terminal, user agent, user device. The first electrical device 110 can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or another processing device connected to a wireless modem.

In an embodiment of the invention, the second electrical device 130 is a host device, or an electrical device with higher processing-performance, such as a portable computer, laptop computer, desktop computer, or tablet computer.

In an embodiment of the invention, the CC interface 120 can be regarded as an interface which supports cache coherency (CC) technology. Cache coherency is a mechanism to keep data-coherency for the common resource of the cache memory. Note, traditionally, the cache coherency (CC) technology is usually applied in the multi-core processor. The common resource of each core processor can keep data-coherency by the cache coherency mechanism. Therefore, unlike traditional applications, in the embodiments of the invention, the cache coherency (CC) technology is applied in data-processing between different devices, and not limited to a multi-core processor of a single device. In an embodiment of the invention, the CC interface 120 establishes a link between the first electrical device 110 and the second electrical device 130 by a wire communication or a wireless communication way. In an embodiment of the invention, the protocol for the CC interface 120 is multi-layer protocol, wherein the protocol of the physical layer is a wire communication protocol or a wireless communication protocol. In an embodiment of the invention, the CC interface 120 is a bus-interface external to the first electrical device 110 and the second electrical device 130, wherein the electrical interface of the bus-interface will be conducted outside.

In an embodiment of the invention, the first processing unit 111 and the second processing unit 131 may be general-purpose processors (GPP), Micro Control Units (MCU), other processing devices, or a multi-core processor. In an embodiment of the invention, the first cache memory unit 112 and the second cache memory unit 132 may be a Last Level Cache (LLC), a snoop filter, or a chipset. In an embodiment of the invention, the first memory unit 113 and the second memory unit 133 may be volatile memory, such as Random Access Memory (RAM). In another embodiment of the invention, the first memory unit 113 and the second memory unit 133 may be non-volatile memory (e.g. flash memory) or combination of above memory device.

In an embodiment of the invention, when the user needs to establish a link between the first electrical device 110 (e.g. a portable device) and the second electrical device 130 (e.g. a notebook), the first electrical device 110 is coupled with the second electrical device 130 by the CC interface 120, and the first electrical device 110 (first processing unit 111) transmits a link-connect request to the second electrical device 130. Note that the link between the first electrical device 110 and the second electrical device 130 of the invention is regarded as a link which is established according to the cache coherency mechanism. After the link is established, the first electrical device 110 can be directly operated by the hardware elements of the second electrical device 130. Specifically, in an embodiment, when the link has been established, the second processing unit 131 of the second electrical device 130 can operate the operating system (OS) of the first electrical device 110 directly, and the first electrical device 110 and the second electrical device 130 may not need to be rebooted. Therefore, the link of the invention is not like normal remote operation (in the remote-operation, the operating system of the first electrical device 110 is still processed by the first electrical device 110) and normal communication between the devices. Therefore, the user can use the second electrical device 130 (e.g. a notebook) which has the second processing unit 131 with higher processing-performance to operate the first operating system of the first electrical device 110. In other embodiments, the second electrical device 130 further comprises other hardware, such as the second memory unit 133 (e.g. system memory), keyboard, mouse, and display unit and other external devices, and this hardware can also help to operate the first operating system of the first electrical device 110. For the user experience, when the user couples the first electrical device 110 (e.g. a portable device) with the second electrical device 130 (e.g. a notebook) by the CC interface 120, the display unit of the notebook further can display the operating system displayed on the portable device, and the processing unit (with higher processing performance) of the notebook can be used to operate the operating system of the portable device to increase the processing-performance. In addition, the notebook and the portable device do not need to be re-booted to achieve a better user experience.

In an embodiment of the invention, if the CC interface 120 establishes the link by a wired communication way, the first electrical device 110 needs to plug into the second electrical device 130 first, and then transmit a link-connect request to the second electrical device 130 via the CC interface 120 to establish the link with the second electrical device 130. In another embodiment of the invention, if the CC interface 120 establishes the link by a wireless communication way, the first electrical device 110 can directly transmit the link-connect request to the second electrical device 130 via the CC interface 120 to establish the link with the second electrical device 130 by the wireless communication way. For example, when the first electrical device 110 approaches the second electrical device 130, the first electrical device 110 may establish the link with the second electrical device 130 via the CC interface 120 by the wireless communication way. To sum up, when the first electrical device 110 is coupled to the second electrical device 130 via the CC interface 120 (by the wired or wirelessly), the first electrical device 110 may transmit the link-connect request to the second electrical device 130.

When the second electrical device 130 receives the link-connect request of the first electrical device 110, the second electrical device will perform an acknowledgement (ACK) action, such as transmitting an ACK message to the first electrical device 110. After the second electrical device 130 has confirmed the link-connect request of the first electrical device 110, the link between the first electrical device 110 and the second electrical device 130 is established via the CC interface 120. Specifically, the first electrical device 110 and the second electrical device 130 will enter a sync mode. In the sync mode, the first cache memory unit 112 of the first electrical device 110 may transmit the content of the first operating system to the second cache memory unit 132 of the second electrical device 130 through the CC interface 120. After the second processing unit 131 of the second electrical device 130 reads the content of the first operating system in the second cache memory unit 132, the second processing unit 131 will operate the first operating system of the first electrical device 110 independently, or operate the first operating system of the first electrical device 110 with the first electrical device 110 to assist the first electrical device 110 in data processing. That is to say, the user can execute and operate all of the functions of the first electrical device 110 on the second electrical device 130 by the hardware of the second electrical device 130. In some embodiments (as FIG. 2A), in the sync mode, the first electrical device 110 not only transmits the content of the first cache memory unit 112 to the second electrical device 130, but also synchronizes the related content which the first operating system is operating in the first memory unit 113 with the second electrical device 130 by the CC interface 120. In these embodiments, the second processing unit 131 only accesses the second cache memory unit 132 and the second memory unit 133 to operate the first operating system continuously and the first electrical device 110 may enter a sleep mode. In other embodiments (as FIG. 2B and 2C), in the sync mode, the first electrical device 110 does not synchronize the related content which the first operating system is operating in the first memory unit 113 with the second electrical device 130. In these embodiments, the second processing unit 131 needs to access the first memory unit 113 of the first electrical device 110 via the CC interface 120.

In addition, because the second electrical device 130 may operate its own operating system (second operating system) before the second electrical device 130 enters the sync mode, the second electrical device 130 may store current status information of the second operating system to the second memory unit 133. Therefore, after the second electrical device 130 disconnects the link with the first electrical device 110, the second electrical device 130 can recover the stored status information of the second operating system to recover the operation of the second operating system of the second electrical device 130.

In an embodiment of the invention, after storing current status information, the second electrical device 130 will perform a re-initiate operation for the hardware elements of the second electrical device 130 to make the first operating system of the first electrical device 110 obtain the related information of the hardware elements (e.g. the second processing unit 131, the second cache memory unit 132, hard disc, network card or an external hardware element, such as mouse and keyboard) of the second electrical device 130. The first operating system of the first electrical device 110 performs an enumeration operation for hardware elements of the second electrical device 130 to obtain the related information of the hardware elements of the second electrical device 130. The first operating system can be operated in the hardware elements of the second electrical device 130 after obtaining the related information of the hardware elements of the second electrical device 130. In an embodiment of the invention, the hardware elements of the second electrical device 130 are re-initiated for an enumeration operation by a specific driving element/program (driver) of the second electrical device 130. In another embodiment of the invention, the hardware elements of the second electrical device 130 are re-initiated for the enumeration operation by a re-initiate command which is transmitted by the processing unit 131.

After the second electrical device 130 has performed the enumeration operation for the hardware elements, the second electrical device 130 will operate the first operating system of the first electrical device 110 by the second processing unit 131 (and other hardware elements) to assist the data-processing of the first electrical device 110. In an embodiment of the invention, after the link between the first electrical device 110 and the second electrical device 130 has been established, the first processing unit 111 of the first electrical device 110 may co-work with the second processing unit 131. Namely, the data of the first electrical device 110 can be cooperatively processed by the first electrical device 110 and the second electrical device 130. In another embodiment of the invention, after the link between the first electrical device 110 and the second electrical device 130 has been established, the first processing unit 111 (and other hardware elements) of the first electrical device 110 will enter a sleep mode and all of the data of the first electrical device 110 is processed by the second electrical device 130.

When the user wants to disconnect the link between the first electrical device 110 and the second electrical device 130, the second electrical device 130 will transmit a link-disconnect request to the first electrical device 110. In an embodiment of the invention, if the first electrical device 110 is in the sleep mode, the second electrical device 130 will awake the first electrical device 110 first. After the first electrical device 110 has received and confirmed the link-disconnect request, the first electrical device 110 will synchronize the updated content of the first operating system by the CC interface 120 to make the data related to the first operating system in the first cache memory unit 112 (further the first memory unit 113) be consistent with the data that has been processed by the second electrical device 130. After the synchronization, the first processing unit 111 of the first electrical device 110 may perform a re-initiate operation on the hardware elements of the first electrical device 110 to make the first electrical device 110 recover a normal operation mode. Namely, the first electrical device 110 can operate the first operating system sequentially.

After the link is disconnected, the second processing unit 131 of the second electrical device 130 will also recover the status information of the second operating system which is stored in the second memory unit 133. Then, the second electrical device 130 may perform a re-initiate operation to recover the original operation which the second electrical device 130 performed before establishing the link.

Figure 2A:
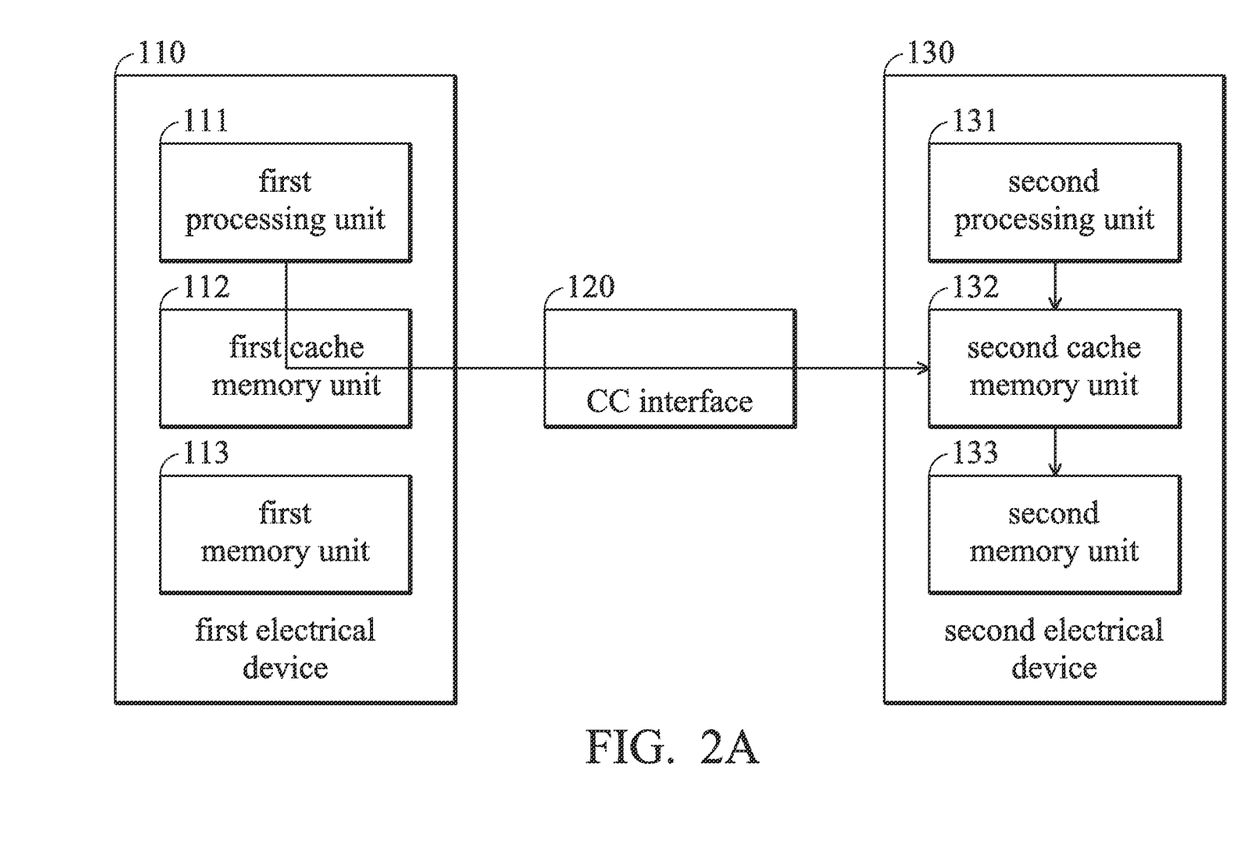
FIG. 2A is a schematic diagram of a first SMP mode according to an embodiment of the invention.
Figure 5A:
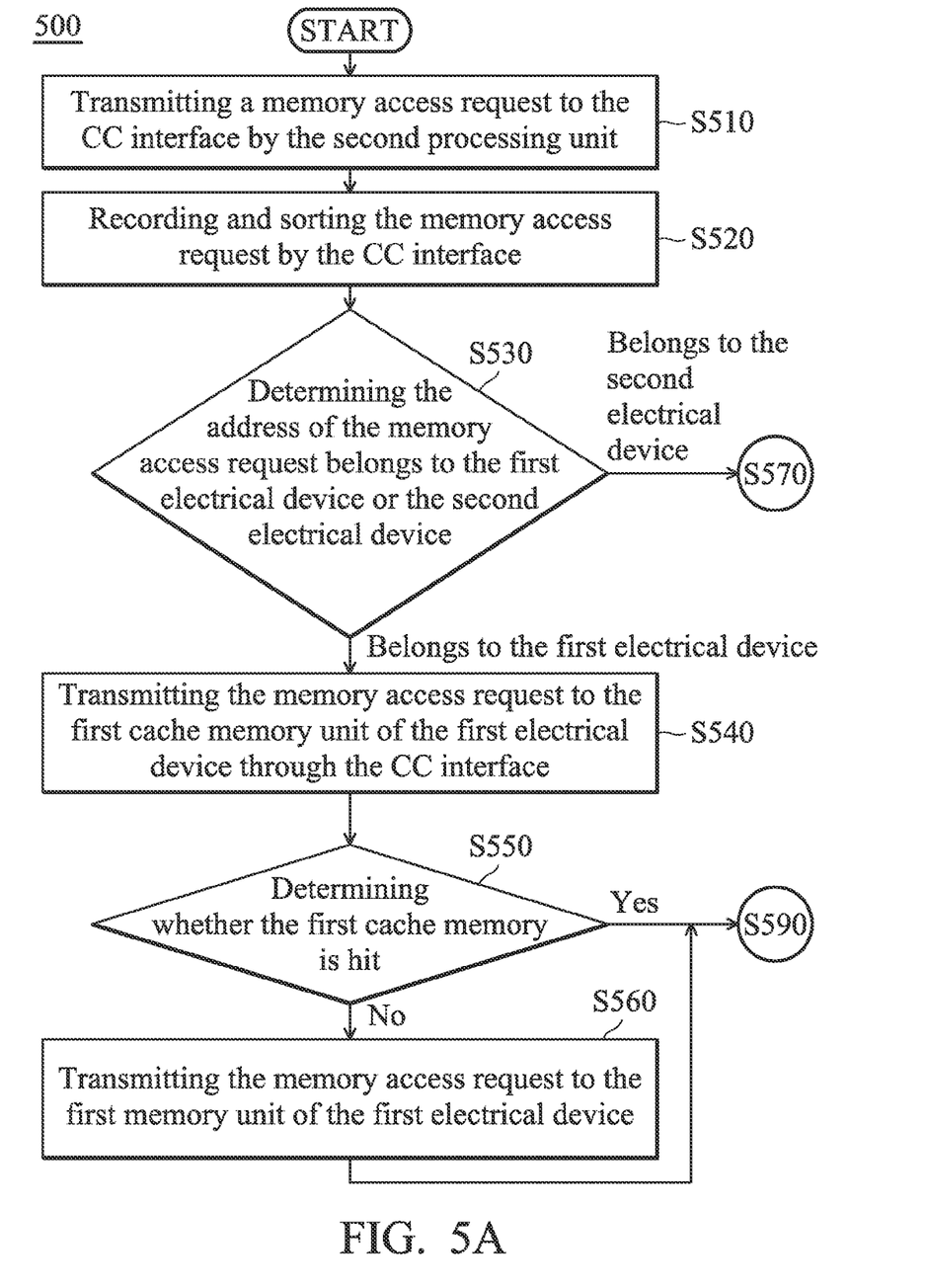
FIG. 5A-5B is a flow chart 500 illustrating the operation of the cache coherency interface according to an embodiment of the invention.

In an embodiment of the invention, after the link between the first electrical device 110 and the second electrical device 130 is established, the second processing unit 131 of the second electrical device 130 and the first processing unit 111 (if the first processing unit 111 is not in a sleep mode) of the first electrical device 110 may co-operate with the first operating system of the first electrical device 110 in a Symmetric Multi-Processors (SMP) mode or a Cache Coherent Non-Uniform Memory Access (ccNUMA) mode. FIG. 2A is a schematic diagram of a first SMP mode according to an embodiment of the invention. As shown in FIG. 2A, in the first SMP mode, the second processing unit 131 and the second memory unit 133 of the second electrical device 130 may be configured to operate the first operating system, and the first memory unit 113 of the first electrical device 110 is not configured to operate the first operating system and enters the sleep mode. Namely, in the first SMP mode, the related content of the first operating system in the first memory unit 113 are synchronized to the second electrical device 130 when the link has been established. Therefore, in the operation of the first SMP mode, the second processing unit 131 and the first processing unit 111 only need to access the second memory unit 133 and the CC interface 120 may maintain the data-coherency of the first cache memory unit 112 and the second cache memory unit 132, and if the first cache memory unit 112 and the second cache memory unit 132 are missed or full, the CC interface 120 will access the second memory unit 133. The specific operation of the CC interface 120 is described in FIG. 5.

Figure 2B:
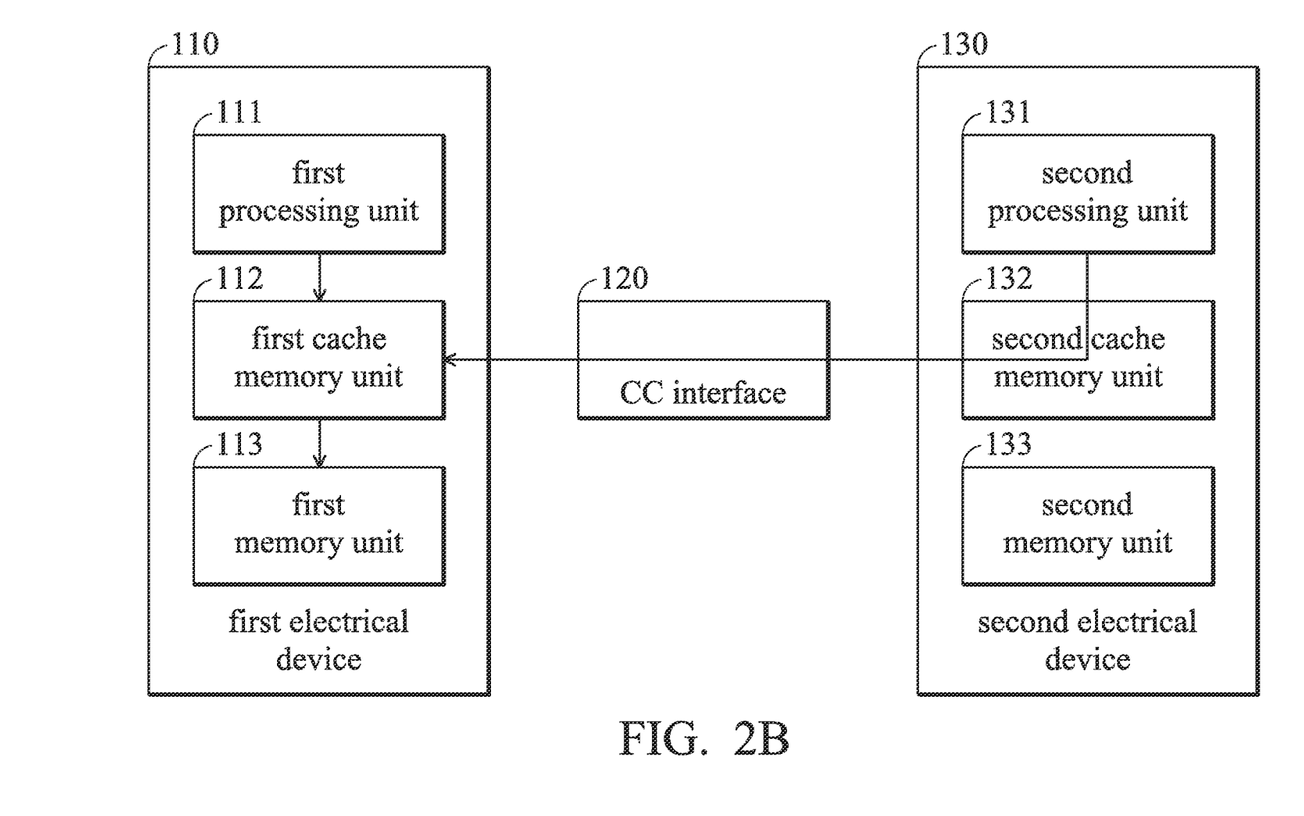
FIG. 2B is a schematic diagram of a second SMP mode according to an embodiment of the invention.

FIG. 2B is a schematic diagram of a second SMP mode according to an embodiment of the invention. As shown in FIG. 2B, in the second SMP mode, the processing unit 131 of the second electrical device 130 assists to operate the first operating system, but the second memory unit 133 does not assist to operate the first operation system. Namely, in the second SMP mode, the second processing unit 131 and the first processing unit 111 can operate the first operating system by accessing the first memory unit 113 only. In the embodiment, when the link has been established, the related content of the first operating system in the first memory unit 113 does not need to synchronize to the second electrical device 130. In the operation of the second SMP mode, the CC interface 120 may maintain the data-coherency of the first cache memory unit 112 and the second cache memory unit 132. If the first cache memory unit 112 and the second cache memory unit 132 are missed or full, the CC interface 120 will access the first memory unit 113.

Figure 2C:
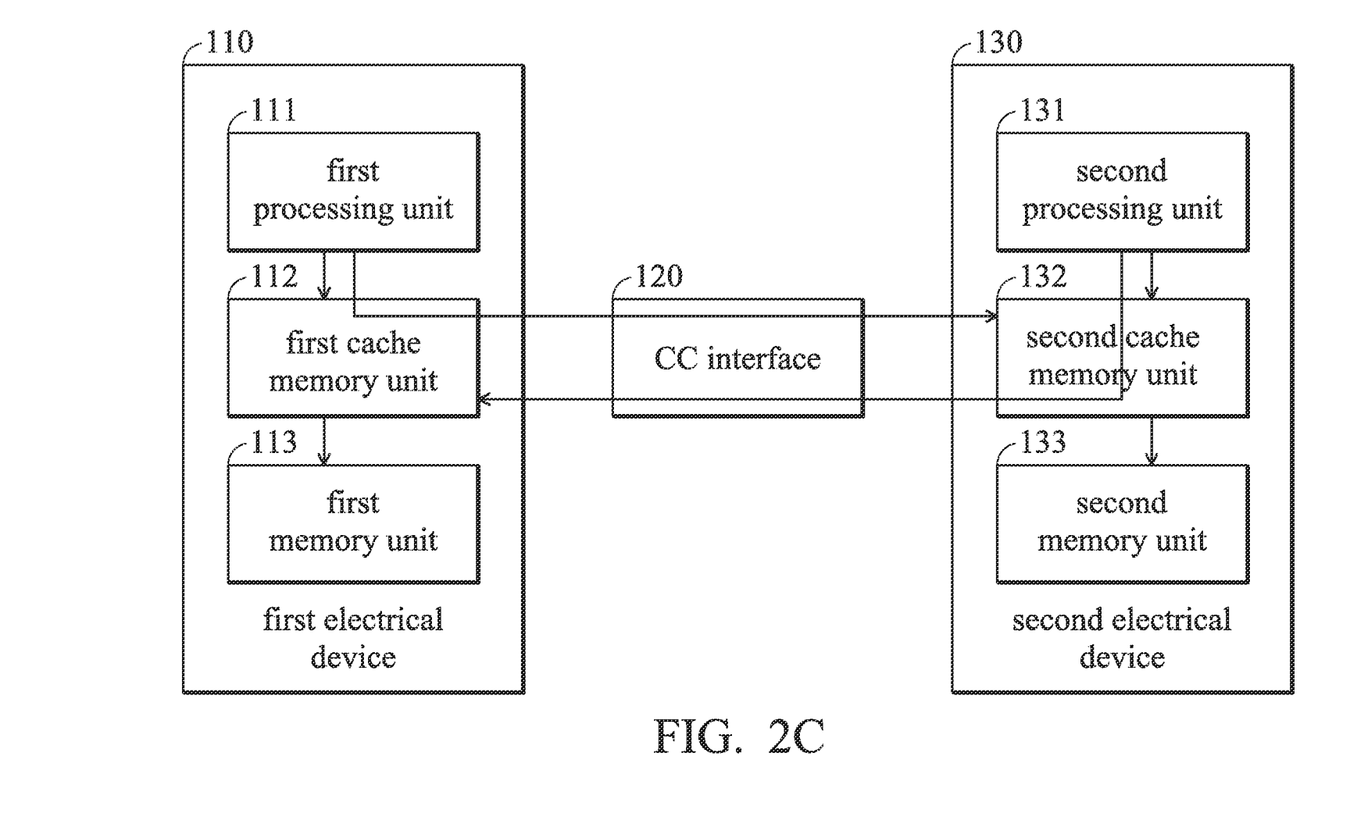
FIG. 2C is a schematic diagram of a ccNUMA mode according to an embodiment of the invention.

FIG. 2C is a schematic diagram of a ccNUMA mode according to an embodiment of the invention. As shown in FIG. 2C, in the ccNUMA mode, both the second processing unit 131 and second memory unit 133 of the second electrical device 130 assist to operate the first operating system, and the first memory unit 113 of the electrical device 110 is not in the sleep mode. Namely in the ccNUMA mode, when the link has been established, the related content of the first operating system in the first memory unit 113 also does not need to synchronize to the second electrical device 130. In the operation of the ccNUMA mode, the CC interface 120 may maintain the data-coherency of the first cache memory unit 112 and the second cache memory unit 132. If the first cache memory unit 112 and the second cache memory unit 132 are missed or full, the CC interface 120 will access the first memory unit 113 or the second memory unit 133.

Figure 3:
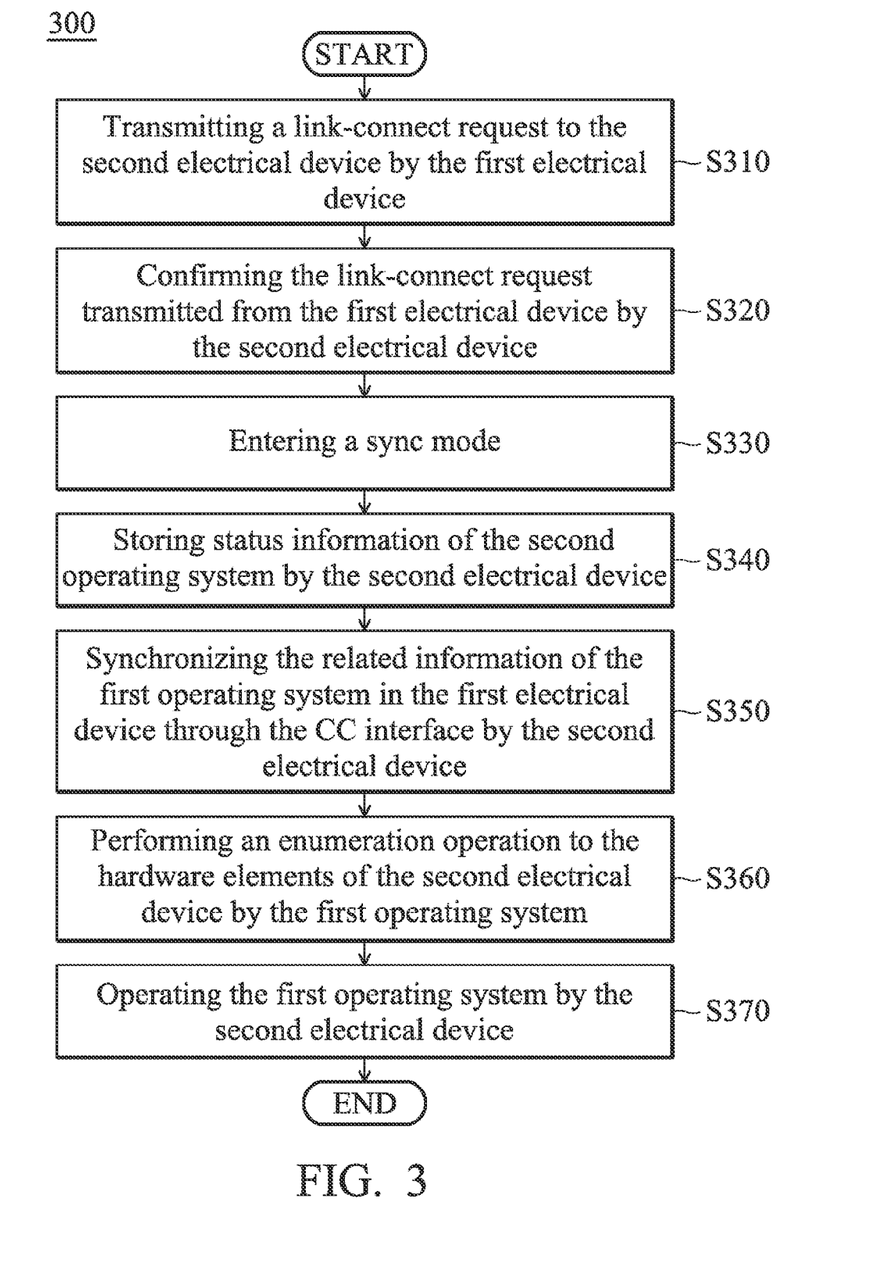
FIG. 3 is a flow chart 300 illustrating the control method for cache coherency according to an embodiment of the invention.

FIG. 3 is a flow chart 300 illustrating the control method for cache coherency according to an embodiment of the invention. The control method is applied by the control system 100. As shown in FIG. 3, in step S310, when the first electrical device 110 is coupled to the second electrical device 130 by the CC interface 120, a link-connect request is transmitted to the second electrical device 130 by the first electrical device 110. In step S320, the link-connect request transmitted from the first electrical device 110 is confirmed by the second electrical device 130. In step S330, the first electrical device 110 and the second electrical device 130 will enter a sync mode. In step S340, status information of the second operating system is stored by the second electrical device 130. In step S350, the related information of the first operating system in the first electrical device 110 is synchronized through the CC interface 120 by the second electrical device 130. In some embodiments of the invention (e.g. embodiments of the FIGS. 2B and 2C), only the related content of the first operating system in the first cache memory unit 112 is synchronized to the second electrical device 130. In other embodiments of the invention (e.g. embodiments of the FIGS. 2A), the relate content of the first operating system in the first memory unit 113 is also synchronized to the second electrical device 130. In step S360, the hardware elements of the second electrical device 130 is performed an enumeration operation by the first operating system to make the first operating system can be operated in the second electrical device 130. In step S370, the first operating system of the first electrical device 110 is operated by the second processing unit of the second electrical device 130 to assist the data-processing of the first electrical device 110. In an embodiment of the invention, after the link has been established, the first operating system is co-operated by the first electrical device 110 and the second electrical device 130. Or the first electrical device 110 enters a sleep mode. Note, steps S320~S360 are specific steps of establishing the link between the first electrical device 110 and the second electrical device 130 by the CC interface 120.

Figure 4:
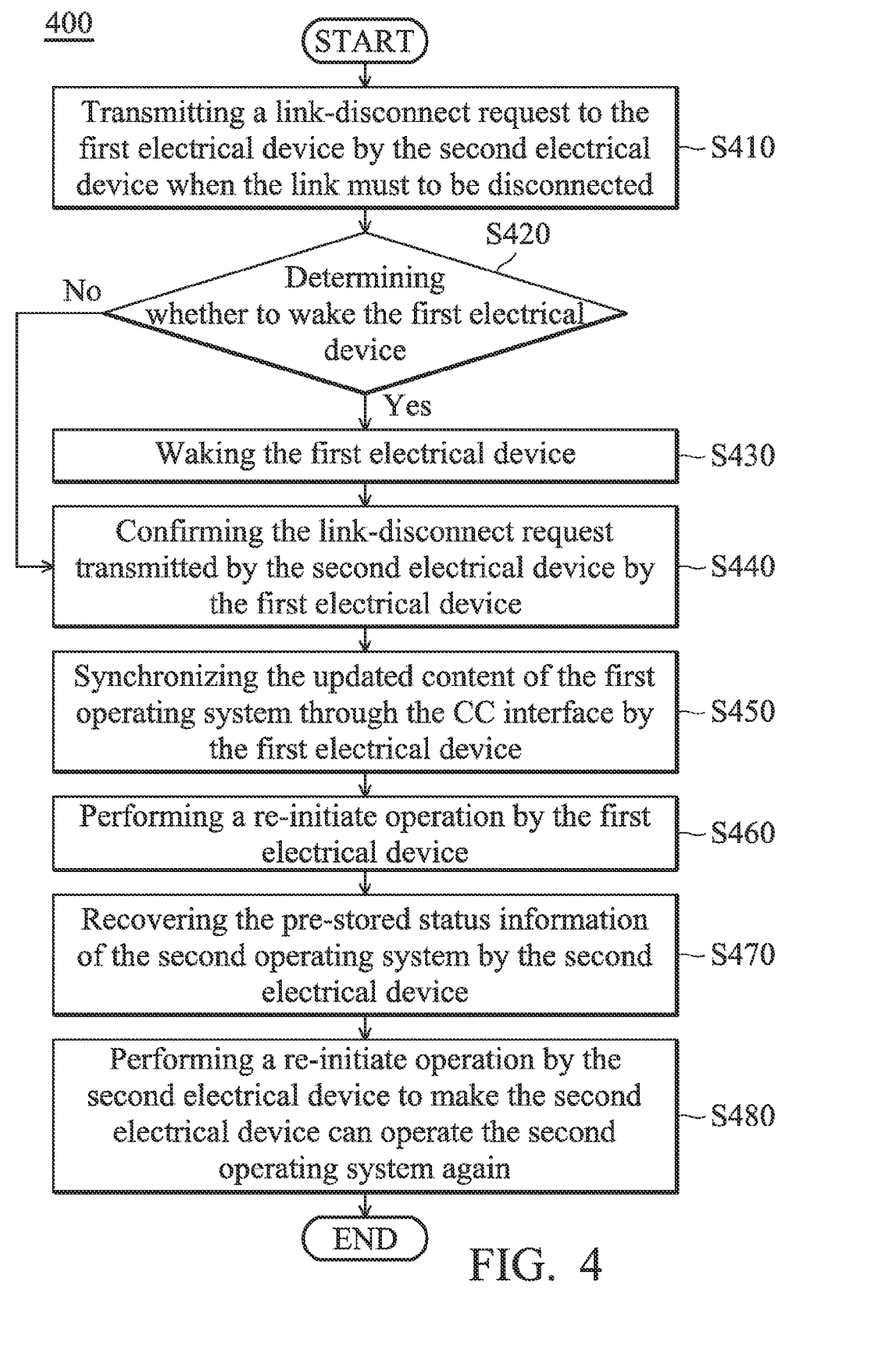
FIG. 4 is a flow chart 400 illustrating the control method for cache coherency according to another embodiment of the invention.

FIG. 4 is a flow chart 400 illustrating the control method for cache coherency according to another embodiment of the invention. The control method is applied by the control system 100. As shown in FIG. 4, in step S410, when the link needs to be disconnected, a link-disconnect request is transmitted to the first electrical device 110 by the second electrical device 130. In step S420, it is determined whether to wake the first electrical device 110. If the first electrical device 110 needs to be woken, step S430 is performed. In step S430, the first electrical device 110 is woken. If the first electrical device 110 does not need to be woken, step S440 is performed. In step S440, the link-disconnect request transmitted by the second electrical device 130 is confirmed by the first electrical device 110. In step S450, the updated content of the first operating system is synchronized through the CC interface 120 by the first electrical device 110. In step S460, a re-initiate operation is performed by the first electrical device 110 to make the first electrical device 110 can independently operate the first operating system again. In step S470, the pre-stored status information of the second operating system is recovered by the second electrical device 130. In step S480, a re-initiate operation is performed by the second electrical device 130 to make the second electrical device 130 can operate the second operating system again.

Figure 5B:
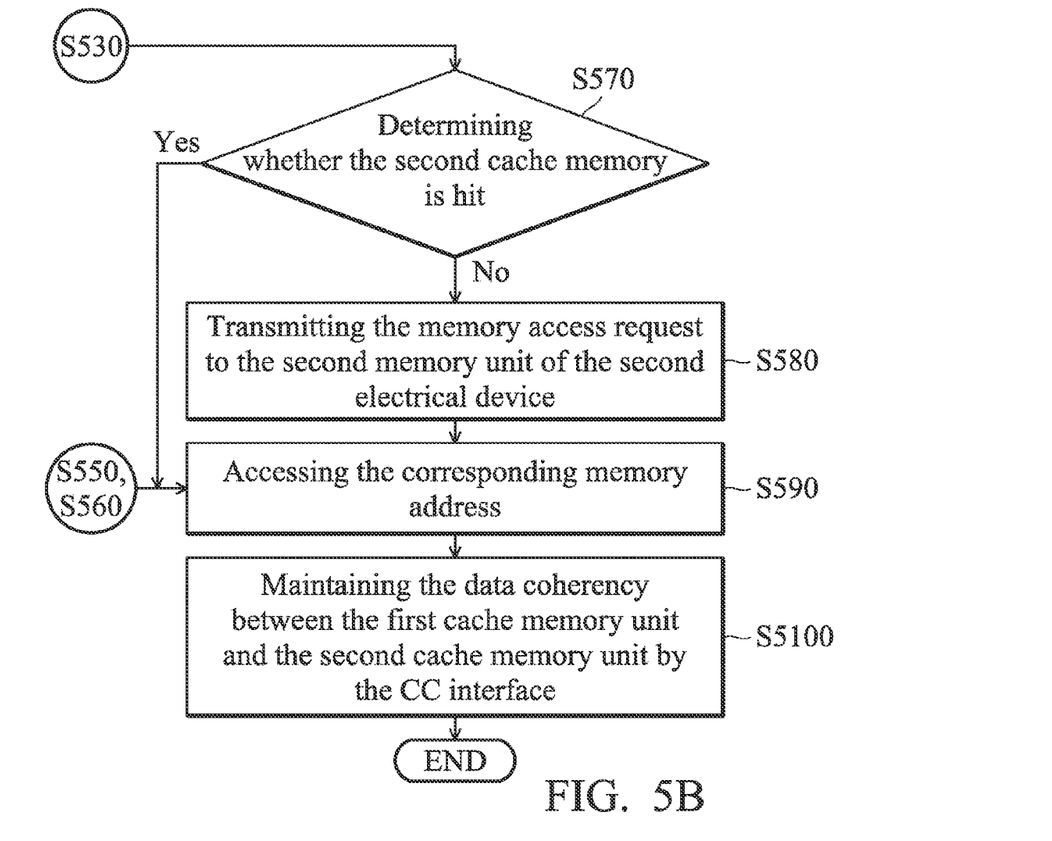

FIG. 5A-5B is a flow chart 500 illustrating the operation of the cache coherency interface according to an embodiment of the invention. The method is applied by the control system 100. As shown in FIG. 5, in step S510, a memory access request is transmitted to the CC interface 120 by the second processing unit 131. In step S520, the memory access request is recorded and sorted by the CC interface 120. In an embodiment of the invention, as shown in FIG. 1, the CC interface 120 comprises an Order Queue 121. The Order Queue 121 records the memory access requests of the second processing unit 131 and the first processing unit 111 (if the first processing unit 111 does not go to the sleep mode), and sorts the memory access request according to the order in which the memory access requests required to be completed. For example, the application procedure of the first operating system specifies the order of the memory access requests, and the sorting result may be transmitted to the second processing unit 131. In an embodiment of the invention, if the first electrical device 110 sends another memory access request to the CC interface 120 at the same time (if the first processing unit 111 co-works with the second processing unit 131 an, the other memory access request may be transmitted by the first processing unit 111; and if the first processing unit 111 is in the sleep mode, the first memory unit 113 or other external devices (e.g. network module) of the first electrical device 110 may be configured to transmit the other memory access request), the CC interface 120 may sort these memory access requests according to the order required by the application code, and transmit the sorting result to the first electrical device 110 and the second electrical device 130.

Then, step S530 is performed. In step S530, it is determined that the address of the memory access request belongs to the first electrical device 110 or the second electrical device 130. In the disclosure, the range of the memory address available for the second processing unit 131 is the same as that available for the first processing unit 111. In the disclosure, the range of the memory address available for the second processing unit 131 could be defined that the second processing unit 131 only can obtain the range of the memory address of the first memory unit 113 or can obtain the ranges of the memory address both of the first memory unit 113 and the second memory unit 133. Step S530 may be performed by the second cache memory unit 132. In an embodiment, the first cache memory unit 112 and the second cache memory unit 132 are located in a Last Level Cache (LLC), a snoop filter, or a Chipset. In another embodiment, step S530 is performed by the CC interface 120.

If the address of the memory access request belongs to the first electrical device 110, step S540 is performed. In step S540, the memory access request is transmitted to the first cache memory unit 112 of the first electrical device 110 through the CC interface 120. Then, step S550 is performed. In step S550, it is determined whether the first cache memory 112 is hit. If the first cache memory 112 is not hit (i.e. miss), that is, the first cache memory 112 does not have the required data of the memory access request, step S560 is performed. In step S560, the memory access request is transmitted to the first memory unit 113 of the first electrical device 110. Then, step S590 is performed. In step S590, the corresponding memory address is accessed in the first memory unit 113. If the first cache memory 112 is hit, step S590 is performed, i.e. the corresponding memory address is accessed in the first cache memory 112.

If the address of the memory access request is belonged to the second electrical device 130, step S570 is performed. In step S570, it is determined whether the second cache memory 132 is hit. If the second cache memory 132 is not hit (miss), that is, the second cache memory 132 does not have the required data of the memory access request, step S580 is performed. In step S580, the memory access request is transmitted to the second memory unit 133 of the second electrical device 130. Then step S590 is performed. In step S590, the corresponding memory address is accessed in the second memory unit 133. If the second cache memory 132 is hit, step S590 is directly performed, i.e. the corresponding memory address is accessed in the second cache memory 132.

In some embodiments, step S5100 is performed after step S590. In step S5100, the data coherency between the first cache memory unit 112 and the second cache memory unit 132 is maintained by the CC interface 120.

Note that, in the embodiment of the FIG. 2A, the range of the memory address which can be accessed by the second processing unit 131 is limited to the second electrical device 130 (i.e. the result of step S530 is always that the address of the memory access request is belonged to the second electrical device 130). In the embodiments of FIGS. 2B and 2C, the range of the memory address which can be accessed by the second processing unit 131 may be located in the first electrical device 110 or the second electrical device 130, and the memory access request is needed to be transmitted to corresponding memory by the CC interface 120.

In the control method for cache coherency of the invention, when the user uses a plurality of electrical devices at the same time, the user can directly process and operate the data and the function of the electrical device of lower performance with the device of higher performance to increase the efficiency and velocity of data processing and achieve a better user experience.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A control method for cache coherency, comprising:
   transmitting, by a first electrical device, a link-connect request to a second electrical device when the first electrical device is coupled to the second electrical device by a cache coherency (CC) interface, wherein the first electrical device and the second electrical device are different apparatuses;
   establishing, by the CC interface, a link between the first electrical device and the second electrical device according to the link-connect request;
   performing a re-initiate operation, by a second processing unit of the second electrical device, for a plurality of hardware elements of the second electrical device to make a first operating system of the first electrical device obtain related information of the plurality of hardware elements after establishing the link;
   performing, by the first operating system, an enumeration operation to the plurality of hardware elements of the second electrical device to make the first operating system operate in the second electrical device;
   operating, by the second processing unit, the first operating system of the first electrical device; and
   maintaining, by the CC interface, data coherency between the first electrical device and the second electrical device, when the first operating system of the first electrical device is operated by the second processing unit of the second electrical device.

2. The control method of claim 1, further the enumeration operation comprising:
   re-initiating, by a specific driver of the second electrical device, the hardware elements of the second electrical device.

3. The control method of claim 1, further comprising:
   pre-storing, by the second electrical device, status information of a second operating system of the second electrical device, before the first operating system of the first electrical device is operated by the second processing unit of the second electrical device.

4. The control method of claim 1, wherein a first processing unit of the first electrical device co-works with the second processing unit of the second electrical device or enters a sleep mode, after the link has been established.

5. The control method of claim 1, further comprising:
transmitting a link-disconnect request to the first electrical device when the link needs to be disconnected;
synchronizing, by the CC interface, data between the first electrical device and the second electrical device; and
recovering the first electrical device to a normal operation mode and recovering status information of a second operating system of the second electrical device after the link is disconnected.

6. The control method of claim 1, further comprising:
operating, by the second processing unit of the second electrical device and a first processing unit of the first electrical device, the first operating system of the first electrical device in a Symmetric Multi-Processors (SMP) mode or a Cache Coherent Non-Uniform Memory Access (ccNUMA) mode.

7. The control method of claim 1, wherein the CC interface establishes the link by a wire communication or a wireless communication way.

8. The control method of claim 1, further comprising:
accessing, by the second processing unit of the second electrical device, a first cache memory unit of the first electrical device through the CC interface after establishing the link.

9. The control method of claim 8, further comprising:
accessing a first memory unit of the first electrical device when the first cache memory is missed or full, when the first cache memory unit of the first electrical device is accessed through the CC interface by the second processing unit of the second electrical device.

10. The control method of claim 8, wherein the step of accessing, by the second processing unit of the second electrical device, the first cache memory unit of the first electrical device through the CC interface after establishing the link further comprises:
transmitting, by the second processing unit, a memory access request to the CC interface;
recording and sorting, by the CC interface, the memory access request; and
determining an address of the memory access request belongs to the first electrical device or the second electrical device.

11. The control method of claim 10, wherein the step of accessing, by the second processing unit of the second electrical device, the first cache memory unit of the first electrical device through the CC interface after establishing the link further comprises:
transmitting, by the CC interface, the memory access request to the first cache memory unit, if the address of the memory access request belongs to the first electrical device; and
transmitting the memory access request to a first memory unit of the first electrical device, if the first cache memory unit does not have required data of the memory access request.

12. The control method of claim 8, wherein the step of accessing, by the second processing unit of the second electrical device, the first cache memory unit of the first electrical device through the CC interface after establishing the link further comprises:
transmitting, by the second processing unit, a memory access request to the CC interface;
transmitting, by the first electrical device, another memory access request to the CC interface;
sorting, by the CC interface, the memory access request and the another memory access request in order; and
transmitting a sorting result to the first electrical device and the second electrical device.

13. The control method of claim 12, wherein the CC interface sorts the memory access request and the another memory access request in order according to an order in which the memory access request and the another memory access request are required to be completed.

14. The control method device of claim 12, wherein the another memory access request is transmitted by an external device of the first electrical device.

15. A control system for cache coherency, comprising:
a first electrical device comprising:
a first processor, transmitting a link-connect request to establish a link; and
a first cache memory unit;
a cache coherency (CC) interface, configured to establish the link according to the link-connect request; and
a second electrical device, comprising:
a second processor, operating a first operating system of the first electrical device, wherein the first electrical device and the second electrical device are different apparatuses;
wherein when the first electrical device is coupled to the second electrical device by the CC interface, the first processor transmits the link-connect request to the second electrical device to establish the link, a second processor performs a re-initiate operation for a plurality of hardware elements of the second electrical device to make the first operating system of the first electrical device obtain related information of the plurality of hardware elements after establishing the link, and before the first operating system of the first electrical device is operated by the second processor of the second electrical device, the first operating system performs an enumeration operation to the plurality of hardware elements of the second electrical device to make the first operating system operate in the second electrical device, and
wherein the CC interface maintains data coherency between the first electrical device and the second electrical device, when the first operating system of the first electrical device is operated by the second processing unit of the second electrical device.

16. The control system of claim 15, wherein the second processor of the second electrical device accesses the first cache memory unit of the first electrical device through the CC interface after establishing the link.

* * * * *